United States Patent
Dostert et al.

(10) Patent No.: US 7,689,989 B2
(45) Date of Patent: Mar. 30, 2010

(54) THREAD MONITORING USING SHARED MEMORY

(75) Inventors: Jan Dostert, Nussloch (DE); Christian Fleischer, Mannheim (DE); Frank Kilian, Mannheim (DE); Petio Petev, Sofia (BG); Randolf Werner, Wiesloch-Baiertal (DE)

(73) Assignee: SAP AG, Walldorf (DE)

( * ) Notice: Subject to any disclaimer, the term of this patent is extended or adjusted under 35 U.S.C. 154(b) by 1315 days.

(21) Appl. No.: 11/024,394

(22) Filed: Dec. 28, 2004

(65) Prior Publication Data

US 2006/0143608 A1    Jun. 29, 2006

(51) Int. Cl.
*G06F 9/46* (2006.01)

(52) U.S. Cl. .......................................... 718/100; 718/1

(58) Field of Classification Search ...................... 718/1, 718/104, 105, 100; 709/213, 224
See application file for complete search history.

(56) References Cited

U.S. PATENT DOCUMENTS

| | | | |
|---|---|---|---|
| 5,682,328 A | 10/1997 | Roeber et al. | |
| 5,905,868 A | 5/1999 | Baghai et al. | |
| 5,909,540 A | 6/1999 | Carter et al. | |
| 5,951,643 A | 9/1999 | Shelton et al. | |
| 6,094,528 A | 7/2000 | Jordan et al. | |
| 6,467,052 B1 | 10/2002 | Kaler et al. | |
| 6,519,594 B1 | 2/2003 | Li | |
| 6,643,802 B1 * | 11/2003 | Frost et al. | 714/37 |
| 6,654,948 B1 * | 11/2003 | Konuru et al. | 717/127 |
| 6,738,977 B1 | 5/2004 | Berry et al. | |
| 6,795,856 B1 | 9/2004 | Bunch | |
| 6,795,966 B1 | 9/2004 | Lim et al. | |
| 6,854,114 B1 * | 2/2005 | Sexton et al. | 718/1 |
| 6,912,553 B1 | 6/2005 | Kolodner et al. | |
| 7,124,170 B1 | 10/2006 | Sibert | |
| 7,127,713 B2 * | 10/2006 | Davis et al. | 717/177 |
| 7,155,512 B2 | 12/2006 | Lean et al. | |
| 7,194,761 B1 | 3/2007 | Champagne | |
| 7,216,160 B2 * | 5/2007 | Chintalapati et al. | 709/224 |
| 7,237,140 B2 | 6/2007 | Nakamura et al. | |
| 7,296,267 B2 | 11/2007 | Cota-Robles et al. | |

(Continued)

FOREIGN PATENT DOCUMENTS

GB    2365553    2/2002

(Continued)

OTHER PUBLICATIONS

"FOA Mailed Aug. 17, 2007 for U.S. Appl. No. 11/013,277", Whole Document.

(Continued)

*Primary Examiner*—Meng-Ai An
*Assistant Examiner*—Gregory A Kessler
(74) *Attorney, Agent, or Firm*—Blakely Sokoloff Taylor & Zafman (57) ABSTRACT

A system and method to monitor worker threads within a Java virtual machine. At least one program is executed on the Java virtual machine to perform a task. A worker thread of the Java virtual machine is assigned to perform the task. Status information for the worker thread is generated and reported into memory external to the Java virtual machine to enable monitoring of the worker thread from external to the Java virtual machine.

16 Claims, 7 Drawing Sheets

U.S. PATENT DOCUMENTS

| | | | |
|---|---|---|---|
| 7,302,423 | B2 | 11/2007 | De Bellis |
| 7,302,609 | B2 | 11/2007 | Matena et al. |
| 7,386,848 | B2 * | 6/2008 | Cavage et al. ............... 718/102 |
| 7,418,560 | B2 | 8/2008 | Wintergerst |
| 2002/0073063 | A1 | 6/2002 | Faraj |
| 2002/0078060 | A1 | 6/2002 | Garst et al. |
| 2002/0083166 | A1 | 6/2002 | Dugan et al. |
| 2003/0009533 | A1 | 1/2003 | Shuster |
| 2003/0014521 | A1 | 1/2003 | Elson et al. |
| 2003/0028671 | A1 | 2/2003 | Mehta et al. |
| 2003/0084248 | A1 | 5/2003 | Gaither et al. |
| 2003/0088604 | A1 | 5/2003 | Kuck et al. |
| 2003/0097360 | A1 | 5/2003 | McGuire et al. |
| 2003/0131286 | A1 | 7/2003 | Kaler et al. |
| 2003/0177382 | A1 | 9/2003 | Ofek et al. |
| 2003/0195938 | A1 | 10/2003 | Howard et al. |
| 2003/0212654 | A1 | 11/2003 | Harper et al. |
| 2004/0024971 | A1 | 2/2004 | Bogin et al. |
| 2004/0078722 | A1 | 4/2004 | Pfeiffer et al. |
| 2004/0080535 | A1 | 4/2004 | Lueckhoff et al. |
| 2004/0181537 | A1 | 9/2004 | Chawla et al. |
| 2005/0005200 | A1 | 1/2005 | Matena et al. |
| 2005/0044301 | A1 | 2/2005 | Vasilevsky et al. |
| 2005/0060704 | A1 | 3/2005 | Bulson et al. |
| 2005/0262181 | A1 | 11/2005 | Schmidt et al. |
| 2005/0278346 | A1 | 12/2005 | Shang et al. |
| 2006/0053112 | A1 | 3/2006 | Chitkara et al. |
| 2006/0206856 | A1 | 9/2006 | Breeden et al. |
| 2007/0266305 | A1 | 11/2007 | Cong et al. |

FOREIGN PATENT DOCUMENTS

| | | |
|---|---|---|
| WO | WO-00/23898 | 4/2000 |

OTHER PUBLICATIONS

"OA Mailed Jan. 7, 2008 for U.S. Appl. No. 11/013,277", Whole Document.
"OA Mailed Mar. 12, 2007 for U.S. Appl. No. 11/013,277", Whole Document.
"FOA Mailed Aug. 17, 2007 for U.S. Appl. No. 11/013,278", Whole Document.
"OA Mailed Feb. 5, 2008 for U.S. Appl. No. 11/013,278", Whole Document.
"OA Mailed Mar. 16, 2007 for U.S. Appl. No. 11/013,278", Whole Document.
"FOA Mailed Aug. 28, 2007 for U.S. Appl. No. 11/012,803", Whole Document.
"OA Mailed Jan. 24, 2008 for U.S. Appl. No. 11/012,803", Whole Document.
"OA Mailed Mar. 16, 2007 for U.S. Appl. No. 11/012,803", Whole Document.
"OA Mailed Jan. 24, 2008 for U.S. Appl. No. 11/024,393", Whole Document.
"FOA Mailed Dec. 11, 2007 for U.S. Appl. No. 11/118,259", Whole Document.
"OA Mailed Apr. 4, 2008 for U.S. Appl. No. 11/118,259", Whole Document.
"OA Mailed Jun. 11, 2007 for U.S. Appl. No. 11/118,259", Whole Document.
"EP 05027361, European Search Report", (Mar. 28, 2006), Whole Document.
USPTO, "OA Mailed Apr. 4, 2008 for U.S. Appl. No. 11/024,392", Whole Document.
"FOA Mailed Aug. 13, 2008 for U.S. Appl. No. 11/013,278 Whole Document".
Galchev, Galin , "Plug-In Based Caching Architecture Capable of Implementing Multiple Cache Regions Per Application", U.S. Appl. No. 11/024,554, filed Dec. 28, 2004—Non-Final Office Action mailed May 28, 2008, 7 pgs.
Galchev, Galin , et al., "Plug-In Based Caching Architecture Capable Of Implementing Multiple Cache Regions Per Application", U.S. Appl. No. 11/024,554, filed Dec. 28, 2004.
Petev, Petio , et al., "Common Cache Management in a Plurality of Virtual Machines", U.S. Appl. No. 11/025,482, filed Dec. 28, 2004.
Petev, Petio , et al., "First In First Out Eviction Implementation", U.S. Appl. No. 11/024,546, filed Dec. 28, 2004.
Petev, Petio G., et al., "Programming Models for Storage Plug-Ins", U.S. Appl. No. 11/024,651, filed Dec. 28, 2004.
Petev, Petio , et al., "Size Based Eviction Implementation", U.S. Appl. No. 11/024,591, filed Dec. 28, 2004.
USPTO, "OA Mailed Jun. 27, 2008 for U.S. Appl. No. 11/024,391", Whole Document.
USPTO, "FOA Mailed Aug. 6, 2008 for U.S. Appl. No. 11/024,393", Whole Document.
USPTO, "FOA Mailed Sep. 17, 2008 for U.S. Appl. No. 11/024,392", Whole Document.
Wintergerst, Michael , "Storage Plugin Based on Shared Closures", U.S. Appl. No. 11/024,613, filed Dec. 28, 2004.
Cheung, KC , et al., "Lightweight Trace and Interpreter for Interprocess Timing Problems", *IP.COM Journal*, IP.COM Inc., West Henrietta, NY US, XP013096988, ISSN: 1533-0001, (Jun. 1, 1992), Whole Document.
EPO, "EP Search Report Mailed Jun. 4, 2008 for EP Patent Application 05027365.5-1225", Whole Document.
Viswanathan, D. , et al., "Java Virtual Machine Profiler Interface", *IBM Systems Journal IBM USA*, vol. 39, No. 1, XP002481425, ISSN: 0018-8670, (2000), 82-95.
Wolczko, Mario , "Using a Tracing Java Virtual Machine to Gather Data on the Behavior of Java Programs", *Internet Citation*, XP002375976, http://research.sun.com/people/mario/tracing-jvm/tracing.pdf, (Retrieved on Apr. 6, 2006), Whole Document.
Non-Final Office Action for U.S. Appl. No. 11/024,393, Mailed Nov. 26, 2008, 29 pages.
Non-Final Office Action for U.S. Appl. No. 11/013,278, Mailed Dec. 23, 2008, 28 pages.
Non-Final Office Action for U.S. Appl. No. 11/012,803, Mailed Dec. 23, 2008, 22 pages.
Notice of Allowance for U.S. Appl. No. 11/024,392, Mailed Mar. 12, 2009, 11 pages.
Final Office Action for U.S. Appl. No. 11/012,803, Mailed Jul. 22, 2008, 22 pages.
Final Office Action for U.S. Appl. No. 11/013,277, Mailed Aug. 7, 2008, 22 pages.
Non-Final Office Action for U.S. Appl. No. 11/013,277, Mailed Jan. 6, 2009, 22 pages.
Notice of Allowance for U.S. Appl. No. 11/024,393, Mailed Apr. 1, 2009, 8 pages.
Notice of Allowance for U.S. Appl. No. 11/012,803, Mailed Jun. 10, 2009, 27 pages.
Notice of Allowance for U.S. Appl. No. 11/013,278, Mailed Jun. 11, 2009, 25 pages.
Notice of Allowance for U.S. Appl. No. 11/013,277 dated Jun. 25, 2009; 24 pages.
Non-Final Office Action for U.S. Appl. No. 11/024,390, Mailed Aug. 31, 2009, 20 pages.
Notice of Allowability for U.S. Appl. No. 11/012,803, Mailed Sep. 3, 2009, 12 Pages.
"European Application Serial No. 05027367.1, Office Action mailed Aug. 11, 2009; 6 pages", (Aug. 11, 2009), 6 pgs.
"XI Exchange Infrastructure; SAP XI Tuning; SAP 2002; pp. 1-16.", (2002).
Alfons Kemper, Donald Kossmann Bernhard Zeller , "Performance Tuning for SAP R/3; IEEE 1999; pp. 32-39.", (1999).
Shaw, "A Complete Guide to OS/2 Interprocess Communications and Devise Monitors; Microsoft System journal, vol. 4, No. 5, Sep. 1989,", (Sep. 1989), pp. 30-35.
USPTO, "Office Action for U.S. Appl. No. 11/013,276 filed Dec. 14, 2004.", (Sep. 17, 2009), Whole Document.
Web Application Server, "Web Application Technology and Web DYNPRO; SAP White pages; SAP 2001;", (2001), pp. 1-29.

\* cited by examiner

| THREAD STATUS INFO | DESCRIPTION |
|---|---|
| THREAD_STATE | /* thread state is unknown, idle in pool, waiting for input, processing /* a task, waiting for back-end I/O |
| CREATION_TIME | /* creation timestamp |
| UPDATE_TIME | /* last update timestamp |
| TASK_TIME | /* last update for main task timestamp |
| SUBTASK_TIME | /* last update for subtask timestamp |
| POOL_NAME | /* name of pool from where thread originated or is to return |
| CLASS_NAME | /* name of Java class that created thread |
| THREAD_NAME | /* name of thread |
| TASK_NAME | /* name of main task |
| SUBTASK_NAME | /* name of subtask |
| USER_NAME | /* name of client generating the task |

THREAD MONITORING USING SHARED MEMORY

TECHNICAL FIELD

This disclosure relates generally to monitoring Java virtual machines, and in particular but not exclusively, relates to monitoring worker threads within Java virtual machines using shared memory.

BACKGROUND INFORMATION

Enterprise software has transformed the way diverse enterprises, large and small alike, transact and manage day-to-day operations. Businesses use enterprise software (e.g., web based application servers) to control production planning, purchasing and logistics, warehouse and inventory management, production, vendor management, customer service, finance, personnel management, and other basic business activities. As the enterprise software industry continues to mature, the various application and hardware resources enlisted to facilitate this diverse set of tasks are being amalgamated into robust, highly integrated solutions (e.g., SAP NetWeaver, SAP xAPPs, mySAP Business Suite, etc.).

To integrate diverse hardware and software resources, developers of enterprise software have leveraged cross platform engines capable of minimizing or even severing platform dependencies from the enterprise solution. The Java 2 Platform, Enterprise Edition™ ("J2EE") (e.g., J2EE Specification, Version 1.4) is a Java based solution supported by the Java Virtual Machine ("JVM") engine. J2EE simplifies application development and decreases the need for programming and programmer training by creating standardized and reusable modular components. The popularity of Java based solutions is evident as the Information Technology ("IT") world has gravitated to the Java language.

As enterprise software is woven into the fabric of modern business, failure of an enterprise solution may no longer be a mere nuisance, but has the potential to wreak catastrophic havoc on a business. As such, robust, reliable software is evermore critical. The enterprise software industry is marching toward the ultimate goal of self-healing software capable of sustainable, uninterrupted operation, without human intervention. In pursuit of this goal, IT technicians can benefit from convenient tools capable of monitoring the health of their enterprise software. With appropriate monitoring tools, IT technicians can take appropriate action in a timely manner to ensure a healthful state of their software or to spot delinquent applications and prevent repeat offenders. Currently, JVMs do not provide adequate mechanisms to monitor their internal operation on a real-time basis.

SUMMARY OF INVENTION

A system and method to monitor worker threads within a Java virtual machine. At least one program is executed on the Java virtual machine to perform a task. A worker thread of the Java virtual machine is assigned to perform the task. The work thread stores place holder information associated with the task. Status information for the worker thread is generated and reported into memory external to the Java virtual machine to enable monitoring of the worker thread from external to the Java virtual machine.

In one embodiment, the worker thread is created with a class having a reporting method. The reporting method imparts reporting functionality to the worker thread capable of reporting the status information into the memory external to the Java virtual machine.

In one embodiment, the worker thread registers a reporting slot within the memory external to the Java virtual machine to store the status information for the worker thread.

In one embodiment, a plurality of reporting slots are registered within the memory external to the Java virtual machine to store status information for a corresponding plurality of worker threads within the Java virtual machine.

In one embodiment, subtasks are associated with the task and the status information is reported into the memory in response to each of the subtasks to provide subtask related information within the status information. In one embodiment, status information corresponding to subtasks within a selectable depth is reported, while status information corresponding to subtasks below the selectable depth is not reported.

In one embodiment, the status information for the worker thread is retrieved from the memory and transmitted to a monitoring console to display the status information.

Embodiments of the invention may include all or some of the above described features. The above features can be implemented using a computer program, a method, a system or apparatus, or any combination of computer programs, methods, or systems. These and other details of one or more embodiments of the invention are set forth in the accompanying drawings and in the description below.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
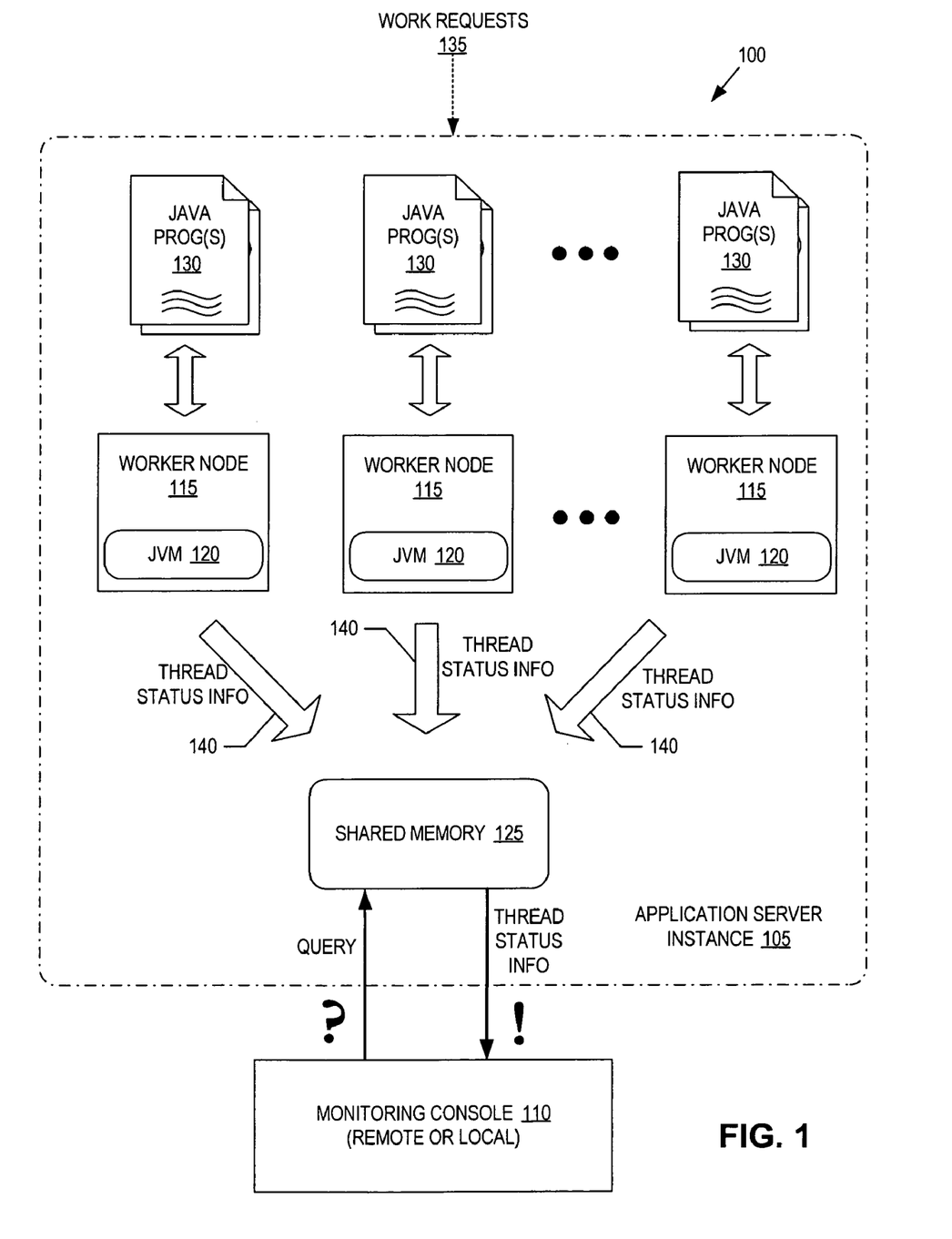
FIG. 1 is a block diagram illustrating a software system for monitoring worker threads within multiple Java virtual machines of an application server instance, in accordance with an embodiment of the invention.

FIG. 1 is a block diagram illustrating a software system 100 for monitoring worker threads within multiple Java virtual machines ("JVMs") of an application server ("AS") instance 105, in accordance with an embodiment of the invention. The illustrated embodiment of software system 100 includes AS instance 105 and a monitoring console 110. The illustrated embodiment of AS instance 105 includes one or more worker nodes 115 each including a JVM 120, and shared memory 125. Java worker nodes 115 provide the runtime environment for JVMs 120, which in turn interpret/execute Java programs 130.

Collectively, Java programs 130 may provide the logic for implementing various sub-layers (e.g., business layer, integration layer, presentation layer, etc.) of AS instance 105. In one embodiment, AS instance 105 is a web application server, such as Web AS by SAP, .NET by Microsoft, or the like. In one embodiment, AS instance 105 represents a Java 2 Platform, Enterprise Edition ("J2EE") instance for providing enterprise software functionality. It should be appreciated that various components of AS instance 105 have been excluded from FIG. 1 for the sake of clarity and so as not to obscure the invention. Although FIG. 1 illustrates three worker nodes 115 within AS instance 105, more or less worker nodes 115 may be established within AS instance 105.

During operation, work requests 135 may be received at AS instance 105 and assigned to any of worker nodes 115 for servicing. JVMs 120 within each worker node 115 may execute Java programs 130 containing logic for servicing the received work requests 135. Each work request 135 may require performing one or more tasks (e.g., retrieve a name and address from a database) which may also include one or more subtasks (e.g., fetch data from database, render data for output, clean memory). To perform multiple tasks in parallel, each JVM 120 may maintain a thread pool having a number of available worker threads to perform the tasks. While performing these tasks and subtasks, each of the worker threads is capable of reporting thread status information 140 into shared memory 125.

Once thread status information 140 is reported into shared memory 125, monitoring console 110 can query shared monitoring memory 125 to display thread status information 140 for review by an Information Technology ("IT") technician. Monitoring console 110 may be located locally on the same hardware machine executing AS instance 105, or advantageously, executed on a remote machine couple to a network. Monitoring console 110 may further monitor an entire cluster of AS instances 105, all from a single remote machine. Using monitoring console 110, the IT technician can remotely monitor the status and operational health of worker threads within each JVM 120 in real-time to ensure AS instance 105 remains in a healthful state. Shared memory 125 working in concert with monitoring console 110, enables the IT technician to make informed decisions when taking preventative and/or remedial action to effectively maintain and manage an enterprise system.

Figure 2:
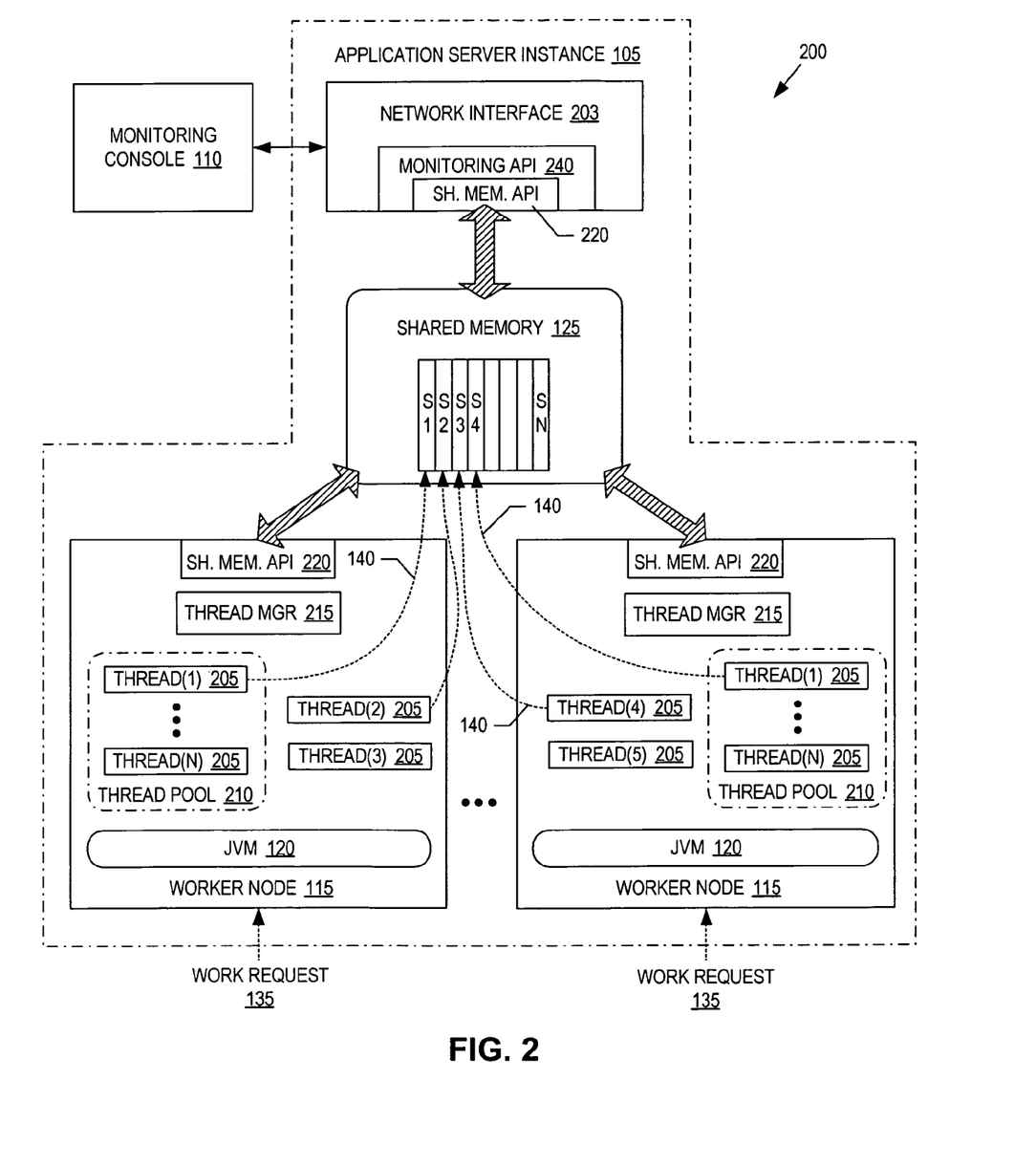
FIG. 2 is a block diagram illustrating a software system for storing thread status information into a shared memory and reporting the thread status information to a monitoring console, in accordance with an embodiment of the invention.

FIG. 2 is a block diagram illustrating a software system 200 including AS instance 105 for monitoring worker threads, in accordance with an embodiment of the invention. FIG. 2 provides further detail of AS instance 105, including a network interface 203, as well as, worker nodes 115 and shared memory 125. As illustrated, each worker node 115 includes a JVM 120, one or more worker threads 205, a thread pool 210, a thread manager 215, and a share memory application programming interface ("API") 220.

Thread manager 215 creates and manages worker threads 205 and thread pool 210. Each worker thread 205 provides a "thread of execution" which may be assigned a task to perform. In general, worker threads 205 share a common address space and run in a quasi-parallel manner. The common address space is reserved by JVM 120 and may contain program text (e.g., Java programs 130) and data, as well as other resources. Each worker thread 205 may include a program counter that keeps track of which instruction to execute next, registers that hold current working variables, and a call stack that contains the execution history (i.e., procedure call history) of the particular worker thread 205. Worker threads 205 enable each JVM 120 to achieve parallelism to perform multiple tasks in a quasi-parallel manner, while supporting sequential processes that make use of blocking system calls (e.g., disk input/output access).

Thread manager 215 acts as a factory for worker threads 205 using an extended thread class, which contains reporting methods for reporting thread status information 140 into shared memory 125. In one embodiment, thread manager 215 is an entity (e.g., Java object) interpreted and executed by JVM 120. In one embodiment, worker threads 205 are Java objects running within JVM 120. When one of worker threads 205 is created, it is instantiated with the extended thread class, thereby inheriting the reporting methods and the ability to report thread status information 140 into shared memory 125. Once one of worker threads 205 is instantiated, it may be said that the worker thread is "instrumented" with reporting functionality.

In one embodiment, these reporting methods perform reporting tasks that are interleaved with execution of work tasks. The reporting tasks update shared memory 125 with the current status of the particular worker thread 205. In one embodiment, the reporting tasks are event based. An event based reporting task updates shared memory 125 in response to a work event that has created new thread status information 140. Event based reporting tasks save time and processing cycles that may otherwise be wasted pulling each worker thread 205 for thread status information 140 that may or may not yet exist.

Upon creation/instantiation, a new worker thread 205 is placed into thread pool 210 as an idle worker thread 205 available to be assigned a task (e.g., THREAD(1)). In one embodiment, thread manager 215 assigns new tasks to each worker thread 205 as work requests 135 arrive. Once assigned a task, the particular worker thread 205 is removed from the thread pool 210, signifying that it is currently busy and not available to perform other tasks. Thread manager 215 also controls whether or not to delete any of worker threads 205 (e.g., to shrink thread pool 210). In response to deletion of one of worker threads 205, the designated worker thread 205 may clean shared memory 125 of any thread status information 140 corresponding to the designated worker thread 205 just prior to its deletion. Alternatively, thread manager 215 may clean shared memory 125 of the corresponding thread status information 140 after the designated worker thread 205 has been deleted.

In one embodiment, shared memory 125 includes reporting slots S1-SN. Each reporting slot may be registered by a worker thread 205 and used by the particular worker thread 205 to store its thread status information 140. Upon deletion of a particular worker thread 205, its corresponding reporting slot may be cleaned and recycled for use by another worker thread 205.

Worker threads 205 (and in some embodiments thread manager 215 as well) access shared memory 125 via shared memory API 220. In one embodiment, shared memory API 220 abstracts access to shared memory 125 through use of function calls. Each worker thread 205 that wishes to report thread status information 140 into shared memory 125 makes a "call" to one or more functions published internally to worker nodes 115 by shared memory APIs 220. Worker threads 205 then pass thread status information 140 to the called function. In turn, the called function copies thread status information 140 into an appropriate reporting slot S1-SN.

In one embodiment, monitoring console 110 transmits status queries to network interface 203 to request thread status information 140, or a portion thereof. Monitoring console 110 can be implemented using the Microsoft Management Console ("MMC"), while network interface 203 may be implemented with a WebService based Start Service. In one embodiment, the status queries are conveyed to network interface 203 using a message based protocol, such as Simple Object Access Protocol ("SOAP") employing extensible markup language ("XML") syntax to send text commands over the HyperText Transport Protocol ("HTTP"). The status query may be transmitted to AS instance 105 automatically on a periodic basis, in response to a specified event, or in response to a screen refresh request by an IT technician.

Upon receipt, the status query is passed to a monitoring API 240. Monitoring API 240 accesses the requested portions of shared memory 125 via its own copy of shared memory API 220. Once monitoring API 240 retrieves the requested portions of thread status information 140 from shared memory 125, thread status information 140 is conveyed to monitoring console 110. In one embodiment, XML syntax is used to convey thread status information 140 to monitoring console 110.

Monitoring console 110 may further format the received thread status information 140 and render it to a screen for review by an IT technician. Monitoring console 110 may display thread status information 140 received from a number of AS instances 105 to monitor an entire cluster of AS instances 105. Monitoring console 110 may further optionally generate log files to maintain long-term status reports on each AS instance 105 being monitored.

In addition to issuing status requests, monitoring console 110 may negotiate a reporting contract with network interface 203 to serve up thread status information 140 on a regular or periodic basis, without need of status requests. As such, network interface 203 may be capable of pushing thread status information 140 to monitoring console 110, as well as, monitoring console 110 pulling thread status information 140 from network interface 203.

Figure 3:
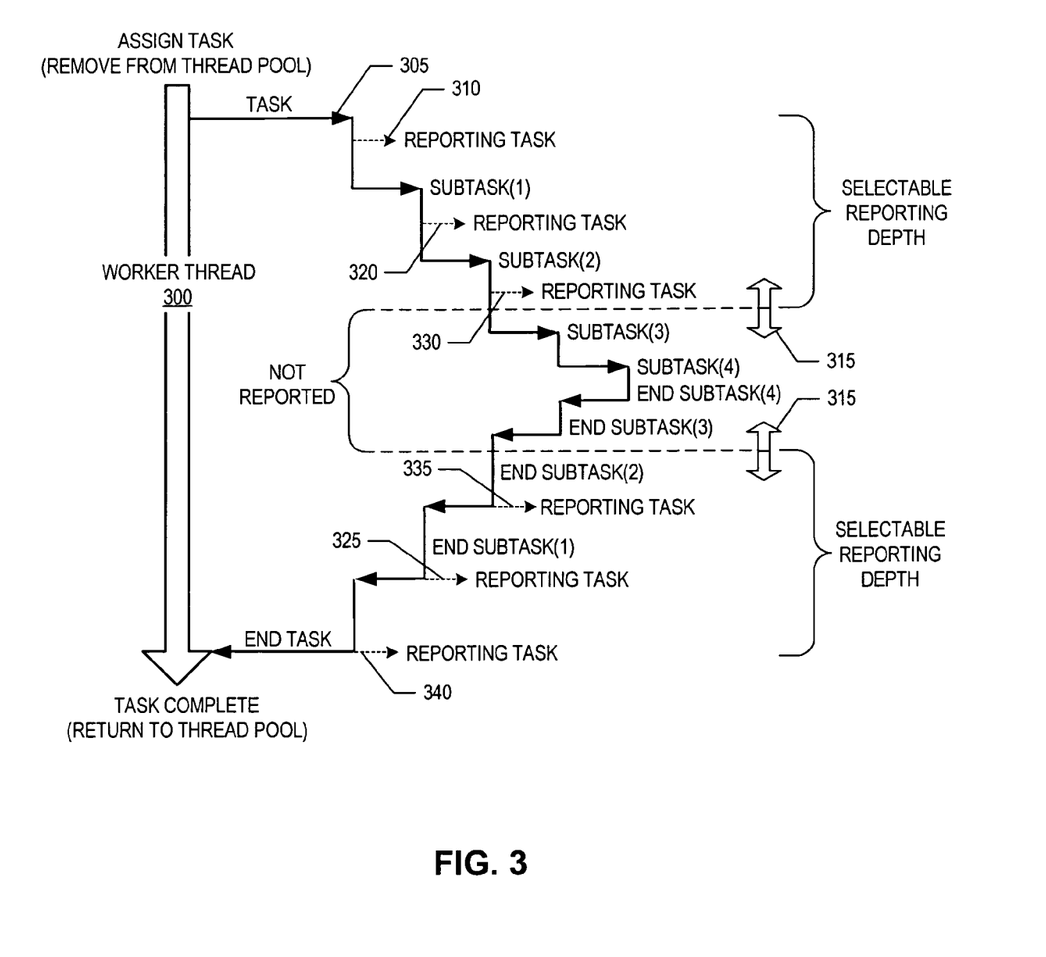
FIG. 3 illustrates a worker thread instrumented to execute a number of reporting tasks, in accordance with an embodiment of the invention.

FIG. 3 illustrates a worker thread 300 instrumented with reporting functionality to execute an number of reporting tasks, in accordance with an embodiment of the invention. Worker thread 300 represents one of worker threads 205 illustrated in FIG. 2. As work requests 135, are received at AS instance 105, work requests 135 are assigned to worker nodes 115 for servicing. Servicing each work request 135 may require performance of a number of tasks, such as task 305, and its corresponding subtasks. In one embodiment, these tasks are assigned by thread manager 215.

Once task 305 is assigned to worker thread 300, worker thread 300 is removed from thread pool 210 indicating that worker thread 300 is busy and not currently available. A first reporting task 310 by worker thread 300 may include updating one of the reporting slots S1-SN within shared memory 125 with thread status information 140 indicating that worker thread 300 is "processing." In one embodiment, as each subtask related to task 305 is performed, the reporting functionality updates the appropriate reporting slot S1-SN of shared memory 125 with new thread status information 140. Reporting tasks may execute in an interleaving manner with the subtasks, as illustrated in FIG. 3.

Subtasks are often organized like a stack. In one embodiment, a selectable reporting depth 315 may be set to report only to a specified depth of this stack. Selectable reporting depth 315 acts as a threshold. Subtasks that occur below the threshold are not reported, while subtasks that occur above the threshold are reported. For example, SUBTASK(1) and SUBTASK(2) are illustrated as occurring above selectable reporting depth 315, while SUBTASK(3) and SUBTASK(4) are not. As such, reporting tasks 320 and 325 corresponding to SUBTASK(1) and reporting tasks 330 and 335 corresponding to SUBTASK(2) are performed. However, no reporting tasks are performed in response to SUBTASK(3) and SUBTASK (4). A final reporting task 340 may also be performing to report into shared memory 125 that worker thread 300 has once again returned to thread pool 210 and is therefore idle.

Figure 4:
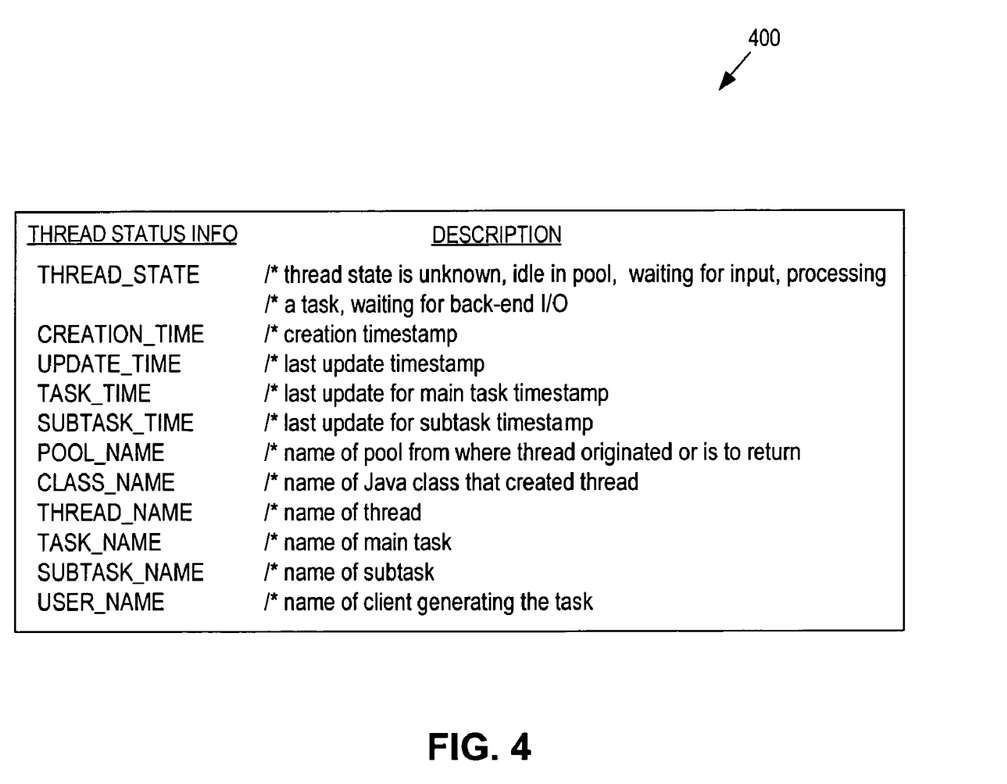
FIG. 4 is a table illustrating examples of thread status information that can be stored into shared memory, in accordance with an embodiment of the invention.

FIG. 4 illustrates a table 400 including examples of thread status information 140 that can be stored into shared memory 125, in accordance with an embodiment of the invention. It should be appreciated that table 400 is not intended to be an exhaustive list of possible thread status information 140, but rather examples of such information. As illustrated, a THREAD_STATE may be reported to indicate the state of each worker thread 205. These states may include idle in thread pool 210, waiting for input, processing a task, waiting for back-end I/O, or the like. A CREATION_TIME provides a timestamp of the creation time of a particular worker thread 205. Each of the examples of thread status information 140 is described in a corresponding entry of the DESCRIPTION column within table 400. Other thread status information 140, which may be reported into shared memory 125, and not illustrated in FIG. 4, include the program counter that keeps track of which instruction to execute next, some or all of the contents of the thread registers that hold current working variables, and the call stack that contains the execution history (i.e., procedure call history) of the particular worker thread 205.

In one embodiment, all thread status information 140 corresponding to a single one of worker threads 205 is maintained within a data structure stored to one of reporting slots S1-SN. Upon termination of one of worker threads 205, the corresponding reporting slot S1-SN is cleaned, and the memory reclaimed for use by a later created worker thread or for other purposes. Accordingly, shared memory 125 provides a snapshot of the current status of all worker threads 205 in all worker nodes 115 of AS instance 115. This snapshot may be periodically (or on demand) transferred to monitoring console 110 via network interface 203. In one embodiment, if longer records are desired, thread status information 140 may be output into log files at AS instance 105 or by monitoring console 110.

Figure 5:
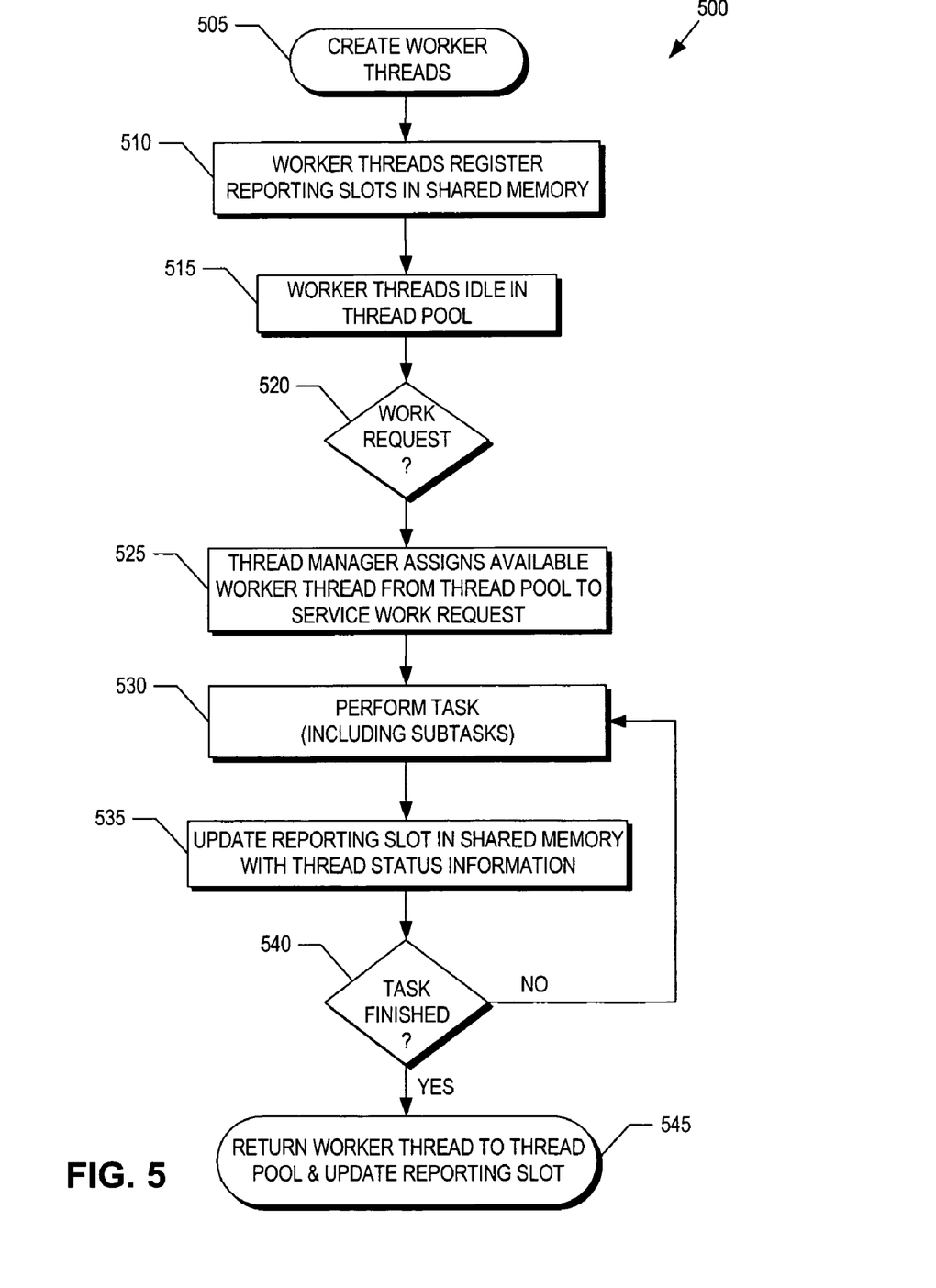
FIG. 5 is a flow chart illustrating a process for monitoring worker threads within a Java virtual machine, in accordance with an embodiment of the invention.

FIG. 5 is a flow chart illustrating a process 500 for monitoring worker threads 205 within JVMs 120, in accordance with an embodiment of the invention. In a process block 505, thread manager 215 creates worker threads 205. Upon creation, each worker thread 205 registers itself a reporting slot S1-SN within shared memory 125 (process block 510). In one embodiment, each reporting slot S1-SN stores a data structure which holds all thread status information 140 corresponding to a single one of worker threads 205. Once worker threads 205 have registered with shared memory 125, each worker thread 205 remains idle in thread pool 210 (process block 515) until a task is assigned to the particular worker thread 205.

If a work request 135 arrives at a worker node 115 (decision block 520), then thread manager 215 assigns an available (i.e., idle) worker thread 205 from thread pool 210 to service a task associated with the received work request 135 (process block 525). In one embodiment, Java programs 130 contain the logic necessary to service work requests 135. During execution, Java programs 130 may initiate one or more tasks and associated subtasks, which are then assigned to worker threads 205 in thread pool 210 to provide a thread of execution.

While the designated worker thread 205 performs the task and associated subtasks (process block 530), the reporting functionality (e.g., reporting methods) included within each worker thread 205 performs reporting tasks to update shared memory 125 with new thread status information 140 (process block 535). As discussed above, the reporting tasks may be performed in an interleaving manner with performance of the tasks and associated subtasks. Once a task and all of its associated subtasks are complete (decision block 540), the designated worker thread 205 returns to thread pool 210 and updates shared memory 125 with its idle status once again (process block 545).

Figure 6:
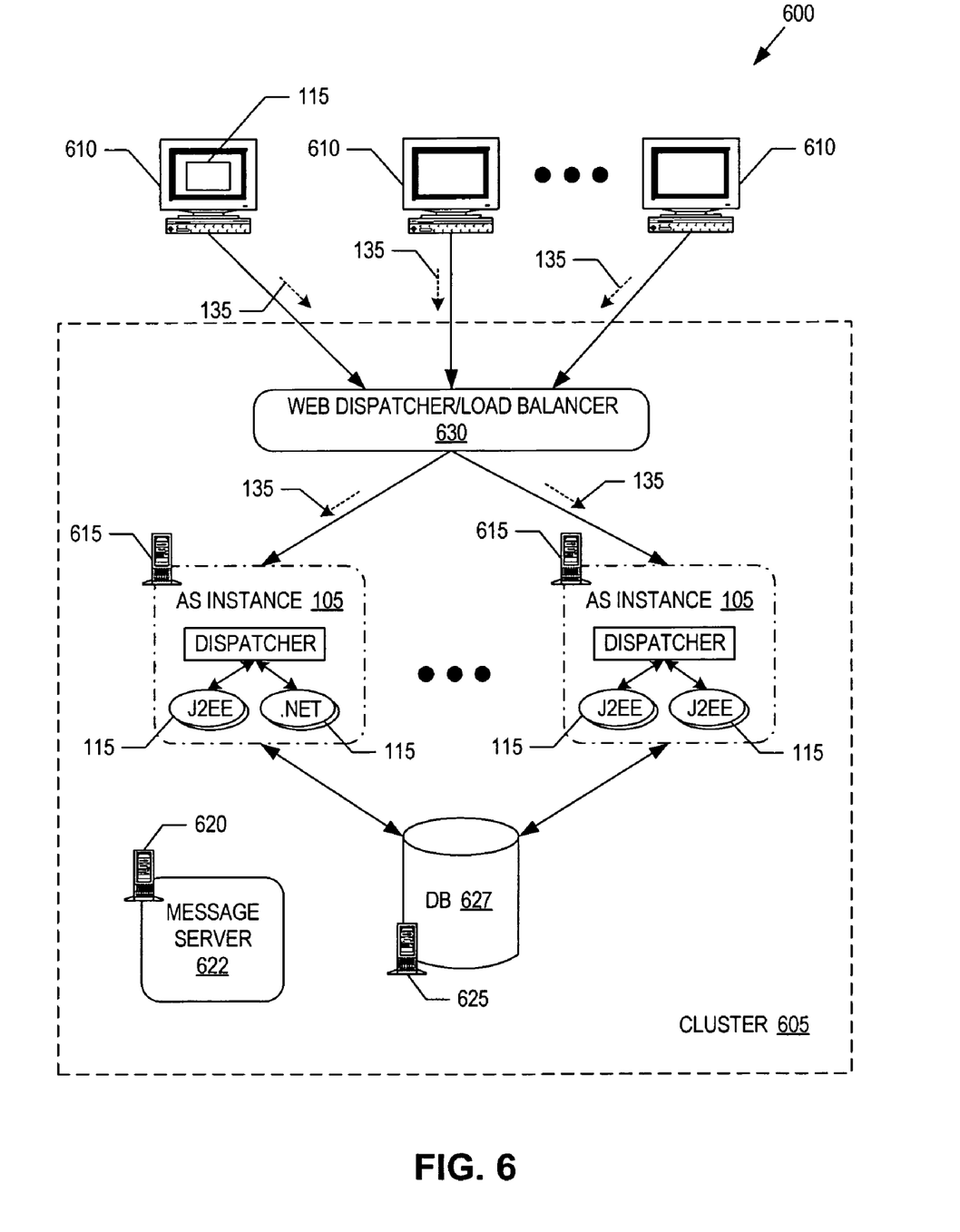
FIG. 6 is a block diagram illustrating a demonstrative enterprise environment for implementing embodiments of the invention.

FIG. 6 is a block diagram illustrating a demonstrative enterprise environment 600 for implementing embodiments of the invention. The illustrated embodiment of enterprise environment 600 includes a cluster 605 coupled to service work requests 135 from client nodes 610. Cluster 605 may include one or more server nodes 615 each supporting one or more AS instances 105, a message server node 620 supporting a message server 622, a database node 625 supporting a database 627, and a web dispatcher 630.

AS instances 105 may be web application servers, such as Web AS by SAP, .NET by Microsoft, or the like. As discussed above, each AS instance 105 may include one or more worker nodes 115 to execute Java programs 130 and service work requests 135. It should be appreciated that various components of AS instances 105 have been excluded from FIG. 6 for the sake of clarity and so as not to obscure the invention. In one embodiment, worker nodes 115 may be compliant with the J2EE standard. In one embodiment, worker nodes 115 may be compliant with the .NET framework from Microsoft. Each AS instance 105 may even include worker nodes 115 compliant with both the J2EE standard and the NET framework.

Web dispatcher 630 implements a load-balancing mechanism distributing work requests 135 from client nodes 610 among server nodes 615 within cluster 605. For example, web dispatcher 630 may implement a round-robin load-balancing mechanism or the like. Web dispatcher 630 may be one of server nodes 615 having the task of dispatching work requests 135 among server nodes 615 of cluster 605 or a stand alone hardware node. Work requests 135 are processed by server nodes 615 and may subsequently be provided to database node 625. Database node 625 offers up the requested data to server nodes 615, which in turn process and format the results for display on client nodes 610. Each AS instance 105 may further include its own dispatcher mechanism to distribute work requests 135 assigned to it among its individual worker nodes 115.

Java programs 130 (see FIG. 1) executed by worker nodes 115 within AS instances 105 may collectively provide the logic for implementing various sub-layers (e.g., business layer, integration layer, presentation layer, etc.) of AS instances 105. For example, Java programs 130 may be servlets providing server-side logic to generate graphical user interfaces ("GUIs") on clients nodes 610 and may further include JavaServer Page ("JSP") extensions for providing dynamic content within the GUI. Java programs 130 may further include business applications providing the business logic of an Enterprise JavaBean ("EJB"), and on client nodes 610 may be applets providing client side logic, and the like.

One of client nodes 610 may execute monitoring console 110 to provide remote monitoring of AS instances 105, and in particular, remote monitoring of each worker thread 205 within each of JVMs 120. If an IT technician notices that one of the worker threads 205 is stuck in an infinite loop, hung, consuming an unusually large amount of resources, or otherwise errant, the IT technician can take appropriate action including deleting the errant worker thread 205 or resetting the problematic JVM 120 executing the errant worker thread 205.

Figure 7:
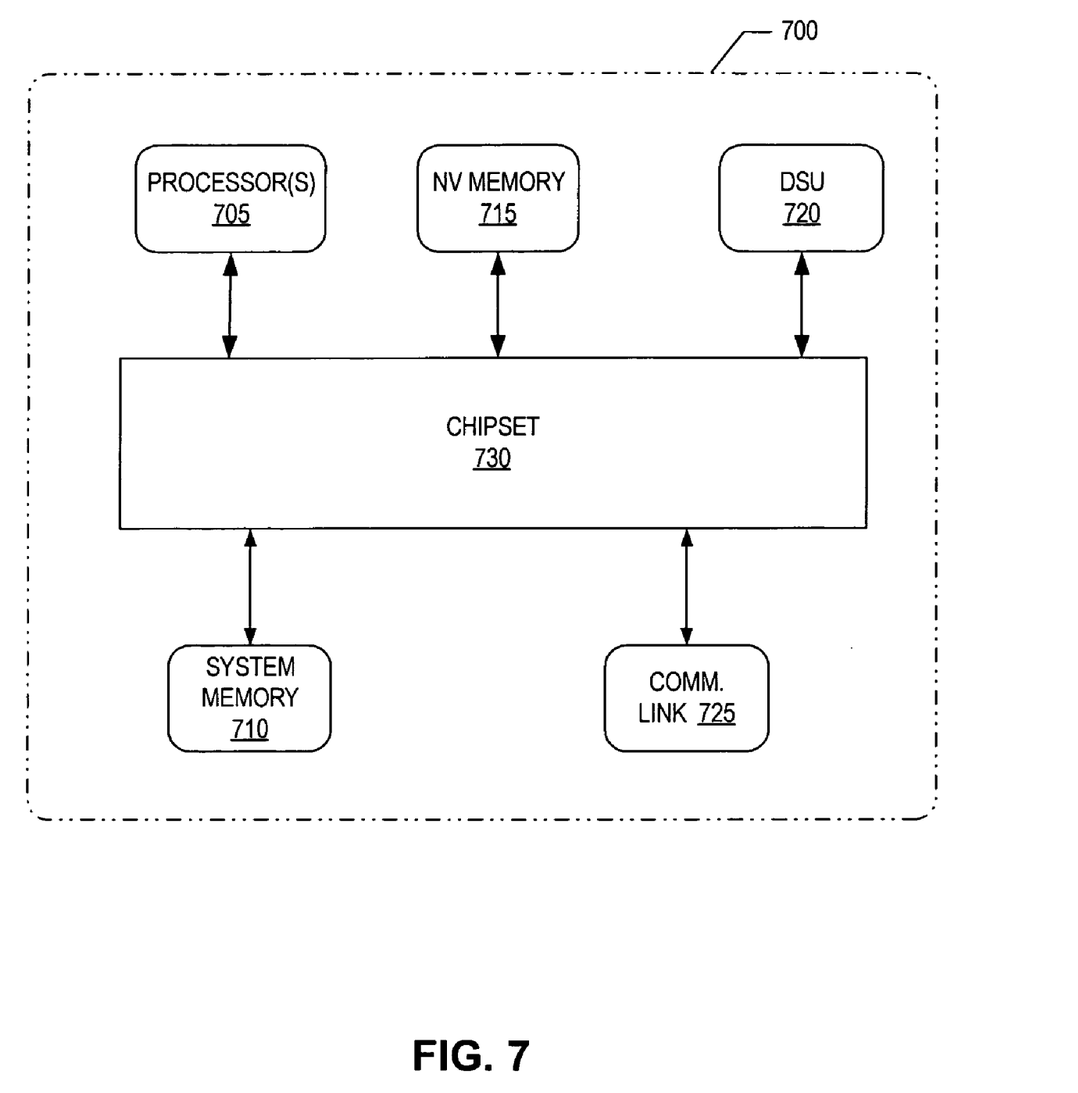
FIG. 7 illustrates a demonstrative processing system for implementing embodiments of the invention.

FIG. 7 is a block diagram illustrating a demonstrative processing system 700 for executing any of AS instance 105, monitoring console 110, process 500, or implementing any of client nodes 610, server nodes 615, message server node 620, or database node 625. The illustrated embodiment of processing system 700 includes one or more processors (or central processing units) 705, system memory 710, nonvolatile ("NV") memory 715, a DSU 720, a communication link 725, and a chipset 730. The illustrated processing system 700 may represent any computing system including a desktop computer, a notebook computer, a workstation, a handheld computer, a server, a blade server, or the like.

The elements of processing system 700 are interconnected as follows. Processor(s) 705 is communicatively coupled to system memory 710, NV memory 715, DSU 720, and communication link 725, via chipset 730 to send and to receive instructions or data thereto/therefrom. In one embodiment, NV memory 715 is a flash memory device. In other embodiments, NV memory 715 includes any one of read only memory ("ROM"), programmable ROM, erasable programmable ROM, electrically erasable programmable ROM, or the like. In one embodiment, system memory 710 includes random access memory ("RAM"), such as dynamic RAM ("DRAM"), synchronous DRAM, ("SDRAM"), double data rate SDRAM ("DDR SDRAM") static RAM ("SRAM"), and the like. DSU 720 represents any storage device for software data, applications, and/or operating systems, but will most typically be a nonvolatile storage device. DSU 720 may optionally include one or more of an integrated drive electronic ("IDE") hard disk, an enhanced IDE ("EIDE") hard disk, a redundant array of independent disks ("RAID"), a small computer system interface ("SCSI") hard disk, and the like. Although DSU 720 is illustrated as internal to processing system 700, DSU 720 may be externally coupled to processing system 700. Communication link 725 may couple processing system 700 to a network such that processing system 700 may communicate over the network with one or more other computers. Communication link 725 may include a modem, an Ethernet card, a Gigabit Ethernet card, Universal Serial Bus ("USB") port, a wireless network interface card, a fiber optic interface, or the like.

It should be appreciated that various other elements of processing system 700 have been excluded from FIG. 7 and this discussion for the purposes of clarity. For example, processing system 700 may further include a graphics card, additional DSUs, other persistent data storage devices (e.g., tape drive), and the like. Chipset 730 may also include a system bus and various other data buses for interconnecting subcomponents, such as a memory controller hub and an input/output ("I/O") controller hub, as well as, include data buses (e.g., peripheral component interconnect bus) for connecting peripheral devices to chipset 730. Correspondingly, processing system 700 may operate without one or more of the elements illustrated. For example, processing system 700 need not include DSU 720.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Process 500 explained above is described in terms of computer software and hardware. The techniques described may constitute machine-executable instructions embodied within a machine (e.g., computer) readable medium, that when executed by a machine will cause the machine to perform the operations described. The machine readable medium may include any of a variety of combinations of machine-accessible physical hardware storage media including, but not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and each coupled to a computer system bus. Additionally, process 500 may be embodied within hardware, such as an application specific integrated circuit ("ASIC") or the like. The order in which some or all of the process blocks appear in process 500 should not be deemed limiting. Rather, one of ordinary skill in the art having the benefit of the present disclosure will understand that some of the process blocks may be executed in a variety of orders not illustrated.

The above description of illustrated embodiments of the invention, including what is described in the Abstract, is not intended to be exhaustive or to limit the invention to the precise forms disclosed. In some examples above, well-known structures, materials, or operations are not shown or described in detail to avoid obscuring certain aspects. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A computer-implemented method, comprising:
    operating an application server instance having a plurality of worker nodes, including for each of the plurality of worker nodes,
        managing one or more worker threads by a thread manager of the worker node,
        executing at least one program on a Java virtual machine ("JVM") of the worker node to service a respective work request received by the application server instance,
        assigning to a worker thread of the worker node a task of the respective work request,
        the assigned worker thread generating status information based on a performance of the task assigned to the worker thread, and
        the assigned worker thread reporting the generated status information into a shared memory of the application server instance, the shared memory external to and shared by the plurality of worker nodes;
    wherein a first work request of the work requests received by the application server instance requests a performance of a first task having a stack of multiple subtasks, each subtask of the task corresponding to a respective depth in the stack;
    wherein a first worker thread in a first worker node of the plurality of worker nodes is assigned to the first task;
    wherein the first worker thread is instantiated by the thread manager of the first worker node to perform both reporting tasks and the subtasks in an interleaved manner;
    wherein the performing of reporting tasks includes the first worker thread reporting into the shared memory first status information generated based on a performance of one of the multiple subtasks, the reporting the first status information based on a selectable reporting depth and the corresponding depth in the stack of the one of the multiple subtasks; and
    exchanging status information in the shared memory from the application server instance to a monitoring console for monitoring of the application server instance.

2. The method of claim 1, wherein managing one or more worker thread includes creating the first worker thread with a class including at least one reporting method, the reporting method imparting reporting functionality to the first worker thread, the reporting functionality to report the status information into the shared memory.

3. The method of claim 2, further comprising registering a reporting slot within the shared memory to store the status information about the first worker thread.

4. The method of claim 3, further comprising registering a first plurality of reporting slots within the shared memory to store the status information about a corresponding first plurality of worker threads of one of the plurality of worker nodes.

5. The method of claim 4, wherein assigning the first worker thread to the first task comprises assigning the first worker thread from a thread pool of available worker threads, and further comprising:
    reporting an idle status into the shared memory for each of the available worker threads idle within the thread pool.

6. The method of claim 1, wherein the first status information includes at least one of a thread state, a thread creation timestamp, a last thread update timestamp, a last task update timestamp, a last subtask update timestamp, a thread pool name, a class name, a thread name, a task name, a subtask name, and a username of a client originating a corresponding one of the work requests.

7. The method of claim 1, wherein the first status information includes a call stack having an execution history of the first worker thread.

8. The method of claim 1, further comprising:
    the monitoring console retrieving the first status information from the shared memory; and
    transmitting the first status information to the monitoring console to display the first status information.

9. A machine-accessible medium that provides instructions that, if executed by a machine, will cause the machine to perform operations comprising:
    operating an application server ("AS") instance having a plurality of worker nodes, including for each of the plurality of worker nodes,
        managing one or more worker threads by a thread manager of the worker node,
        executing a program on a Java virtual machine ("JYM") of the worker node to service a respective work request received by the AS instance,
        assigning to a worker thread of the worker node a task of the respective work request,
        the assigned worker thread generating status information based on a performance of the task assigned to the worker thread, and
        the assigned worker thread storing the generated status information into a shared memory external to and shared by the plurality of worker nodes;

wherein a first work request of the work requests received by the AS instance requests a performance of a first task having a stack of multiple subtasks, each subtask of the task corresponding to a respective depth in the stack;

wherein the first task is assigned to a first worker thread in a first worker node of the plurality of worker nodes;

wherein the first worker thread is instantiated by the thread manager of the first worker node to perform both reporting tasks and the subtasks in an interleaved manner;

wherein the performing of reporting tasks includes the first worker thread reporting into the shared memory first status information generated based on a performance of one of the multiple subtasks, the reporting the first status information based on a selectable reporting depth and the corresponding depth in the stack of the one of the multiple subtasks; and exchanging status information in the shared memory from the AS instance to a monitoring console for monitoring of the AS instance.

10. The machine-accessible medium of claim 9, further providing instructions that, if executed by the machine, will cause the machine to perform further operations, comprising:

creating each of the worker threads of the plurality of worker nodes to include a reporting method, wherein the reporting method of each of the worker threads reports corresponding status information into the shared memory.

11. The machine-accessible medium of claim 10, further providing instructions that, if executed by the machine, will cause the machine to perform further operations, comprising:

registering a reporting slot within the shared memory for each of the worker threads, the reporting slot to store the status information corresponding to one of the worker threads.

12. The machine-accessible medium of claim 11, wherein generating the status information includes generating the status information while executing the tasks.

13. A system, comprising:

a server node to execute an application server ("AS") instance having a plurality of worker nodes, the AS instance including logic executable by a processor of the server node to:

for each of the plurality of worker nodes, manage one or more worker threads by a thread manager of the worker node, execute a program on a Java virtual machine ("JVM") of the worker node to service a respective work request received by the AS instance;

assign to a worker thread of the worker node a task of the respective work request, generate with the assigned worker thread status information based on a performance of the task assigned to the worker thread, and report the generated status information into a shared memory which is external to and shared by the plurality of worker nodes;

wherein a first work request of the work requests received by the AS instance requests a performance of a first task having a stack of multiple subtasks, each subtask of the task corresponding to a respective depth in the stack;

wherein the first task is assigned to a first worker thread in a first worker node of the plurality of worker nodes;

wherein the first worker thread is instantiated by the thread manager of the first worker node to perform both reporting tasks and the subtasks in an interleaved manner;

wherein the performing of reporting tasks includes the first worker thread reporting into the shared memory first status information generated based on a performance of one of the multiple subtasks, the reporting the first status information based on a selectable reporting depth and the corresponding depth in the stack of the one of the multiple subtasks; and exchange status information in the shared memory from the AS instance to a monitoring console for monitoring of the AS instance.

14. The system of claim 13, wherein the worker threads of the plurality of worker nodes each include reporting functionality to report status information into the shared memory.

15. The system of claim 14, wherein the shared memory includes reporting slots to store the status information, each of the reporting slots to store only status information from one of the worker threads.

16. The system of claim 13, further comprising a client node to execute the monitoring console, the monitoring console including logic executable by a processor of the client node to:

send a status query to the server node;

receive the status information from the server node; and display the status information in a user readable format.

* * * * *